July 6, 1954  E. A. HENRY  2,682,767
MEANS FOR AMPLIFYING RESONANCE REACTION SIGNALS
IN FREQUENCY MODULATED OSCILLATORS
Filed July 27, 1951
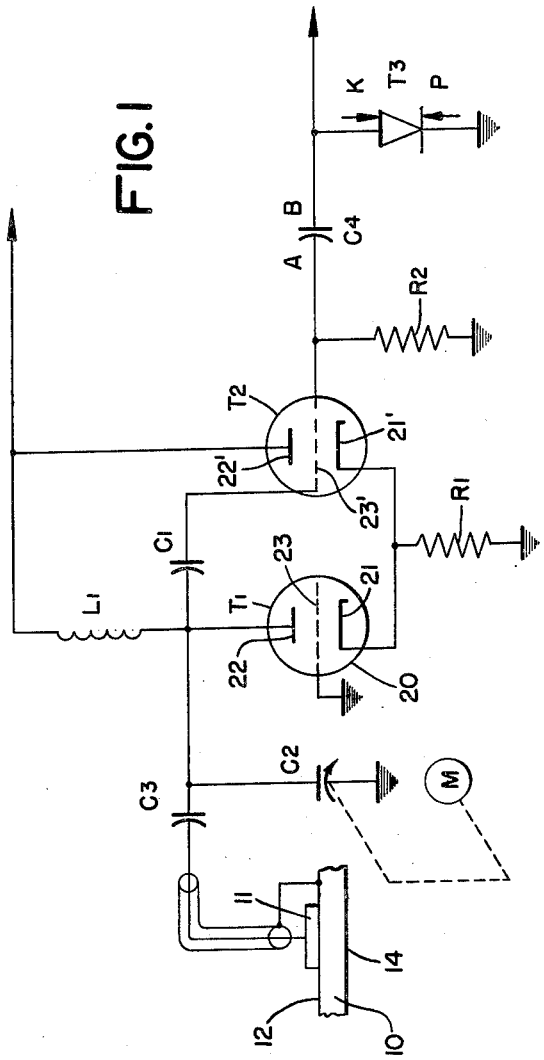
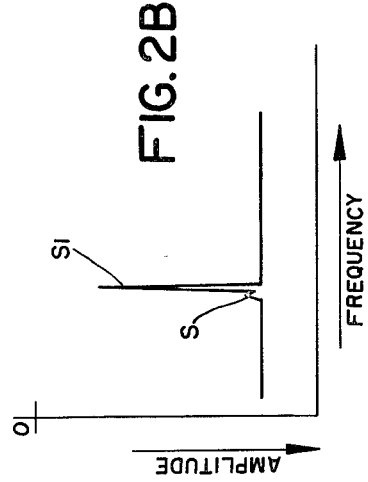
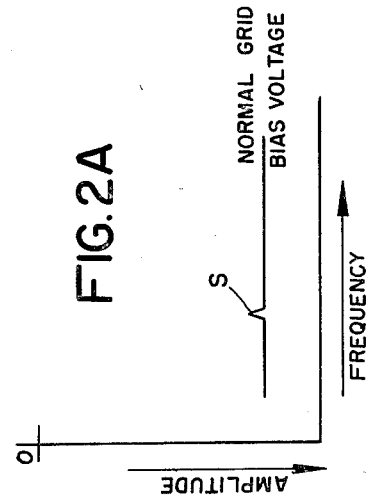
*INVENTOR.*
ELLIOTT A. HENRY
BY
*Joseph H. Lipschutz*
ATTORNEY.

Patented July 6, 1954

2,682,767

UNITED STATES PATENT OFFICE 2,682,767

MEANS FOR AMPLIFYING RESONANCE REACTION SIGNALS IN FREQUENCY MODULATED OSCILLATORS

Elliott A. Henry, Bridgeport, Conn., assignor to Sperry Products, Inc., Danbury, Conn., a corporation of New York Application July 27, 1951, Serial No. 238,975

1 Claim. (Cl. 73—67)

1

This invention relates to ultrasonic resonance testing of the type wherein a range of ultrasonic frequencies is periodically applied to a load in order to determine at which frequency resonance occurs. Resonance will occur when one-half wave length of the instantaneous frequency, or harmonic thereof, is equal to the thickness of the material being traversed by the ultrasonic vibrations. When such resonance occurs, a sudden increase in power will be delivered to the work piece and such increase in power delivered may be detected by any one of a number of known responsive mechanisms. The variation in power flow is such as to cause a drop in the radio frequency voltage across the tank circuit of the oscillator, but such variation is of a relatively small magnitude which must be substantially amplified in order to actuate the indicating means. The limitation on amplification is the signal-to-noise ratio and therefore there is a definite limitation on the amount of amplification that can be used.

It is therefore the principal object of this invention to provide means for obtaining a relatively large indication of resonance reaction in frequency modulated oscillators so as to obtain a much larger signal without additional amplification.

Further objects and advantages of this invention will become apparent in the following detailed description thereof.

In the accompanying drawings,

Fig. 1 is a wiring diagram embodying the principle of this invention.

Figs. 2A and 2B are graphs illustrating the results obtained with the present invention.

Referring to Fig. 1, I have illustrated this invention in connection with determining the thickness of a work piece 10, but it will be understood from the following description that the invention has more general application to any type of frequency modulated oscillator where resonance is to be detected. In the present case the vibration is applied to the work piece 10 through a piezoelectric element 11 which may be a quartz crystal applied to a surface 12 of object 10. The crystal 11 is connected to a frequency modulated oscillator, to be described hereinafter, so that a range of frequencies is applied to the crystal. When a frequency is reached such that the thickness of work piece 10 between surface 12 and surface 14 equals one-half the wave length of the instantaneous frequency, a state of resonance will be obtained in which an increased power will be delivered from the oscillator into the work piece.

2

Such resonance will occur not only at the fundamental frequency but also at harmonics of the respective fundamental frequency.

For applying a signal voltage of varying frequency to object 10 there may be provided an oscillator 20 consisting of two tubes T1 and T2 having direct coupling between their cathodes 21, 21' and a feed-back from anode 22 to the grid 23' by way of the feed-back capacitor C1. Inductance coil L1 and capacitor C2 (together with the circuit, cable, and transducer capacity) comprise the tank circuit which determines the frequency of the oscillator. A blocking capacitor C3 is provided to prevent the D. C. anode voltage which is applied to anode 22 from being applied to crystal 11 while providing a low impedance path for the R. F. oscillations. Resistor R2 is the grid return for tube T2 and it is across this resistor that the bias for T2 is developed as a result of the R. F. signal voltage coupled to the grid 23' of tube T2 between feed-back capacitor C1 and the diode action of the grid-cathode 23'—21' of tube T2. It will thus be seen that the negative voltage on grid 23' of tube T2 will be approximately equal to the peak R. F. voltage across the tank circuit L1—C2, and any change in this tank circuit voltage, such as would be caused by a change in load at resonance, would instantly result in a change in the grid voltage. Such change in the voltage on grid 23' caused by resonance may be coupled to an amplifier through capacitor C4 and resistance T3 and after being suitably amplified can be indicated on any suitable indicator, such as a meter or oscilloscope.

To obtain a range of frequencies for application to crystal 11 the capacitor C2 may be motor-driven to frequency modulate the oscillator between predetermined limits. The varying frequency is thus applied to crystal 11 between such limits and when resonance is obtained the load is diminished, causing a change in voltage across the tank circuit L1—C2 which in turn will produce a change in the bias voltage on grid 23' of tube T2. As stated in the introduction hereto, this change in voltage is relatively small in proportion to the total R. F. voltage and requires large amplification, but the degree of amplification is limited by the signal-to-noise ratio and therefore the signal voltage obtained from the amplifier output will be relatively small as shown at S in graph A of Fig. 2.

Therefore I have provided the following means whereby a greater magnitude of resonance reaction voltage output may be obtained (approximately ten times or more) at resonance from the oscillator than has heretofore been obtained. For this purpose instead of employing the usual resistance in the coupling network which comprises the capacitor C4 and resistance T3, I make T3 a diode which may be either a germanium diode or a diode tube. These diodes offer high resistance to a current flowing in one direction and relatively low resistance to a current flowing in the opposite direction. Thus when there is no resonance in work piece 10 and relatively high negative voltage is applied to grid 23', plate A of capacitor C4 will have a surplus of electrons. When resonance occurs and grid 23' becomes less negative, some of the electrons on plate A must go to plate B through R2 and through the diode in the direction of arrow P. The resistance at diode T3 to current flow in the direction of arrow P is very high and the circuit behaves as though diode T3 was actually a very high resistance. As soon as the frequency of the oscillator passes beyond the point of resonance in the work piece 10 the voltage begins to rise across the tank circuit and the grid 23' of tube T2 becomes more negative again. As soon as this occurs, some of the electrons from plate B must be transferred back to plate A, and for a current flow in the direction K the diode T3 may be considered as a very low resistance or in its conducting state. As this occurs, plate B of capacitor C4 is at ground potential and therefore capacitor C4 and the oscillator feed-back capacitor C1 form a voltage divider and reduce the magnitude of the feed-back voltage in proportion to the reactances of C1 and C4. This greatly reduces the voltage across the tank circuit and as a consequence greatly reduces the grid bias voltage of grid 23' of tube T2. This sharp reduction in signal voltage will, with the same degree of amplification as used in obtaining signal S of graph A, Fig. 2, result in a signal S' which is shown greatly exaggerated in time in graph B. Thus referring to the graph B of Fig. 2 it will be seen that after an instantaneous decrease in the output of the amplifier due to the passing of the resonant frequency, there will be a sudden increase in signal. The values of C4 and C1 are so chosen as to yield the largest drop in voltage on grid 23' without stopping oscillation of the oscillator system.

Having described my invention, what I claim and desire to secure by Letters Patent is:

In an ultrasonic resonance measuring device having an electro-acoustic transducer in engagement with an object, an oscillator for energizing said transducer to produce vibrations, said oscillator comprising a pair of electron discharge tubes each having an anode, a cathode, and a grid, a frequency determining circuit coupled to the anode of the first tube and the grid of the second tube, there being a coupling capacitor between said anode and said grid, means for effectively maintaining the grid of the first tube at zero reference potential and the anode of the second tube at a predetermined potential, and impedance means connected between said cathodes and point of zero reference potential for coupling said cathodes together, and an output circuit coupled to the grid of said second tube and comprising an impedance connected to said second tube grid and to ground, a diode, and a coupling capacitor having one plate connected to said second tube grid and the other plate connected to one electrode of said diode, the other electrode of said diode being connected to ground, means for continuously and cyclically varying the frequency of the vibrations so that increased power will be delivered from the oscillator to the object at resonance and the negative bias on the grid of the second tube will be reduced, the diode being connected in the output circuit so that electron flow in said circuit as a result of the reduction in negative bias on the grid of the second tube at resonance is substantially blocked, the rise in negative bias on the grid of the second tube causing electron flow in the opposite direction, said diode providing a path of relatively low impedance to the flow of electrons in said opposite direction.

References Cited in the file of this patent

UNITED STATES PATENTS

| Number | Name | Date |
| --- | --- | --- |
| 2,431,234 | Rassweiler et al. | Nov. 18, 1947 |